(No Model.)
T. BERGMANN.
SPITTOON.
No. 311,636. Patented Feb. 3, 1885.
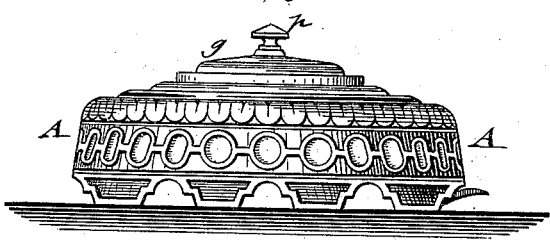
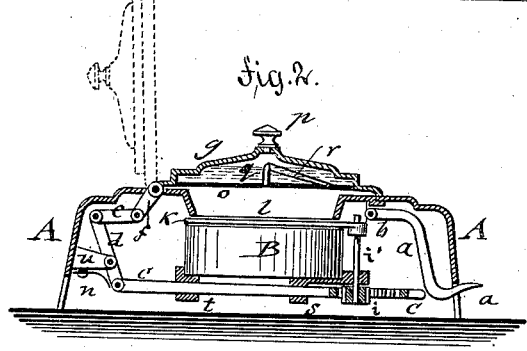 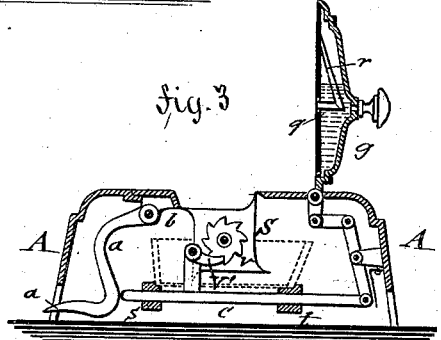
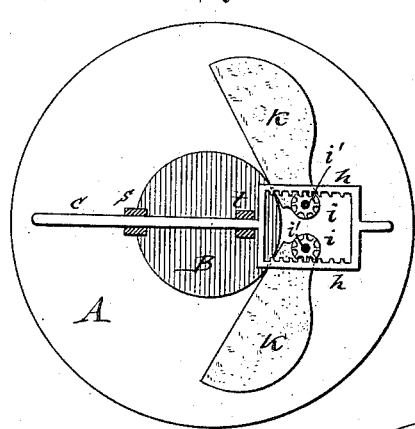 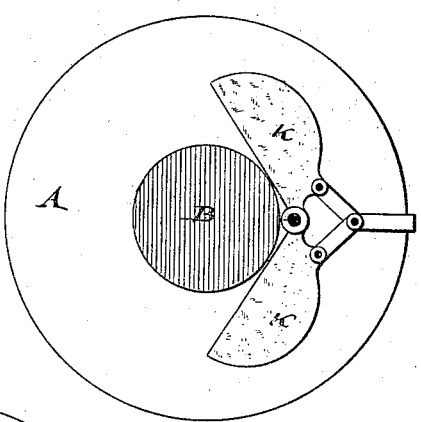
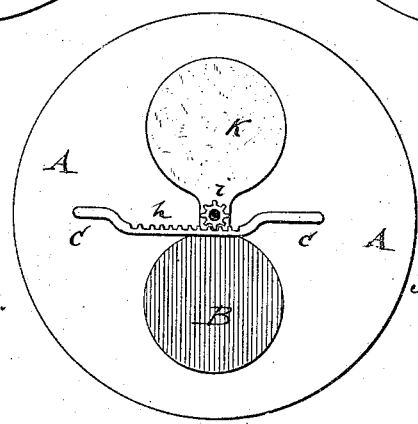
WITNESSES:
Jos. H. Rosenbaum.
Martin Petry.
INVENTOR
Theodor Bergmann
BY
Göpel & Raegener
ATTORNEYS.

UNITED STATES PATENT OFFICE.

THEODOR BERGMANN, OF GAGGENAU, BADEN, GERMANY.

SPITTOON.

SPECIFICATION forming part of Letters Patent No. 311,636, dated February 3, 1885.

Application filed July 12, 1884. (No model.)

*To all whom it may concern:*

Be it known that I, THEODOR BERGMANN, of Gaggenau, Grand Duchy of Baden, and Empire of Germany, have invented certain new and useful Improvements in Spittoons, of which the following is a specification.

My invention refers to improvements in spittoons and other receptacles for refuse matter; and it consists in providing the exterior casing of the spittoon with a hinged lid, which is opened and closed by a treadle. A detachable vessel at the interior of the receptacle is closed with an auxiliary laterally-movable lid upon which the refuse matter is deposited before being dropped into the receptacle below the same. The outer lid is made hollow and filled partly with disinfecting material, a few drops of which are discharged into the receptacle at each opening and closing of the outer lid.

In the accompanying drawings, Figure 1 is a side elevation of my improved spittoon; Fig. 2, a vertical central section of the same; Fig. 3, a vertical central section of a modified construction; and Figs. 4, 5, and 6 are bottom views of different modifications of the spittoon and the mechanism for operating the inner auxiliary lid.

Similar letters of reference indicate corresponding parts.

A is a casing of my improved spittoon, which casing is made of cast metal and of suitable size and shape. It is provided with a funnel-shaped opening, $l$, at the top, and closed by a hinged outer lid, $g$, which covers said opening $l$.

B is a vessel or receptacle, placed within the casing below the funnel-shaped opening $l$.

$k\ k$ are semicircular plates, which are pivoted at one end, and which form an inner auxiliary lid for the vessel B when the plates are closed. The plates $k\ k$ are so arranged that their upper surfaces just touch the lower edge of the funnel $l$.

$a$ is a treadle or foot-lever, pivoted at $b$.

$c$ is a horizontal rod, which slides in guides $s$ and $t$, and which is operated by the treadle $a$.

$f$ is a crank-arm rigidly connected to the hinged lid $g$; $d$, a lever fulcrumed on a bracket, $u$, the lower end of the lever $d$ being pivoted to the slide-rod $c$, while the upper end is connected by a pivot-link, $e$, with the crank-arm $f$.

$n$ is a spring attached to the casing or to the bracket $u$, and pressing the slide-rod $c$ against the treadle $a$. The slide rod $c$ has two racks, $h\ h$, which mesh with pinions $i\ i$, mounted upon vertical pivots $i'\ i'$ of the auxiliary lids $k$, which are rigidly attached to the upper ends of the pivots. By depressing the outer end of the treadle $a$, Fig. 1, the slide-rod $c$ is pushed in, and by the intervention of the lever $d$, link $e$, and arm $f$, the lid $g$ opened as shown in dotted lines in Fig. 2. At the same time the racks $h\ h$ turn the pinions $i\ i$ and cause the lids $k\ k$, attached to the pivots $i'\ i'$ of the pinions, to move over the receptacle and close the same by meeting at their straight sides. The lids $k\ k$ form in this position, in connection with the funnel $l$, the preliminary receiver for the substances to be deposited in the vessel B. When, after depositing any substance upon the lids $k\ k$, the treadle $a$ is released, the spring $n$, assisted by the weight of the lid $g$, pushes the rod $c$ back to its original position, the lid $g$ is closed, and the auxiliary lids $k\ k$ are moved back and opened by the action of the racks $h\ h$ and pinions $i\ i$, so as to assume their former position. (Shown in Fig. 4.) While being moved apart the lids $k\ k$ pass close to the lower edge of the funnel $l$, and any matter remaining upon them is thereby scraped off and dropped into the vessel B. The outer lid, $g$, has a bottom, $o$, which forms a closed vessel with a small filling-opening at the top, which opening is closed by a knob, $p$. From the bottom $o$ of the lid $g$ a small tube, $q$, passes into the space between the bottom and top of the lid. A small gutter, $r$, rests upon the bottom $o$, and is connected to the upper end with the tube $q$. The lid $g$ is partly filled with a suitable disinfecting-liquid, which, when the lid is open, as in Fig. 3, is retained at one side of the lid; but while the lid is being opened a few drops pass through the gutter $r$ into the tube $q$, and are dropped into the vessel B, when the lid is closed again. By these means a few drops of disinfecting-liquid are supplied to the vessel B whenever the treadle is operated.

If desired, the apparatus may be used without a disinfecting-liquid.

The arrangement of the casing, auxiliary lids, and mechanism for operating the same may be varied in many ways. For instance, the funnel may be located at one side of the casing, as indicated in Fig. 6, and be closed by one of two lids, k, operated by a pinion, i, and by a rack, h, on the rod c; or the two lids k k may be operated by links, as shown in Fig. 5; or they may be arranged in the shape of a prism, s, revolving on pivots, the sides of which close the opening of the funnel l of the casing, as shown in Fig. 3. The prismatic lid s is operated by a ratchet-wheel, v, and a pawl, v', mounted upon an arm of the slide-rod c.

Having thus described my invention, I claim as new and desire to secure by Letters Patent—

1. The combination of a casing having a funnel-shaped opening, a hinged outer lid, a treadle, and intermediate mechanism connected to the lid for opening and closing the same, a receiving-vessel at the interior of the casing, auxiliary lids arranged below the funnel-shaped opening, and mechanism whereby the auxiliary lids are connected to the treadle mechanism and closed or opened while opening or closing the outer lid, substantially as set forth.

2. The combination of a casing or receptacle for refuse matter, a hinged lid or cover, a treadle, and mechanism, substantially as described, intermediately between the treadle and lid, whereby the lid is opened or closed by depressing or releasing the treadle, substantially as set forth.

3. The combination of a casing having a funnel-shaped opening, a hinged lid for the same, auxiliary lids below the opening, a treadle or foot-lever pivoted to the casing, a spring-acted slide-rod operated by the treadle or foot-lever, and mechanism, substantially as shown, connecting the slide-rod with the outer and auxiliary lids, so as to raise the outer lid and place the auxiliary lids below the opening on depressing the treadle, substantially as set forth.

4. The combination of a casing, A, having a funnel-shaped opening, l, and a hinged lid, g, laterally-swinging auxiliary lids k k, arranged below the opening, a vessel, B, a treadle, a, a spring-acted slide-rod, c, having racks h h, pinions i i, pivots i' i', to which the lids k k are attached, lever d, link e, and crank-arm f, constructed and operating substantially as set forth.

5. In a receptacle for refuse matter, the combination of an inclosing casing, a hollow hinged cover containing a disinfecting-liquid, and means, arranged in the hollow cover, as described, whereby a few drops of the disinfecting-liquid are discharged whenever the lid is raised and lowered, substantially as set forth.

In testimony that I claim the foregoing as my invention I have signed my name in presence of two subscribing witnesses.

THEODOR BERGMANN.

Witnesses:
   FRED P. WILKIE,
   JOSEF HERRSCHMANN.